Aug. 20, 1968

A. K. LYLE ETAL 3,397,609

OPTICAL INSPECTION APPARATUS FOR SURFACE COATINGS ON ARTICLES
OF GLASSWARE OR THE LIKE WHEREIN THE ARTICLES ARE
INSPECTED IN A LIQUID HAVING THE SAME INDEX
OF REFRACTION AS THE GLASS

Filed Feb. 25, 1965

INVENTORS
AARON K. LYLE
CONSTANTINE W. KULIG

BY McCormick, Paulding & Huber

ATTORNEYS

Aug. 20, 1968　　　A. K. LYLE ETAL　　　3,397,609
OPTICAL INSPECTION APPARATUS FOR SURFACE COATINGS ON ARTICLES
OF GLASSWARE OR THE LIKE WHEREIN THE ARTICLES ARE
INSPECTED IN A LIQUID HAVING THE SAME INDEX
OF REFRACTION AS THE GLASS

Filed Feb. 25, 1965　　　3 Sheets-Sheet 2

INVENTORS
AARON K. LYLE
CONSTANTINE W. KULIG

BY McCormick, Paulding & Huber
ATTORNEYS

Aug. 20, 1968 A. K. LYLE ETAL 3,397,609
OPTICAL INSPECTION APPARATUS FOR SURFACE COATINGS ON ARTICLES
OF GLASSWARE OR THE LIKE WHEREIN THE ARTICLES ARE
INSPECTED IN A LIQUID HAVING THE SAME INDEX
OF REFRACTION AS THE GLASS
Filed Feb. 25, 1965  3 Sheets-Sheet 3
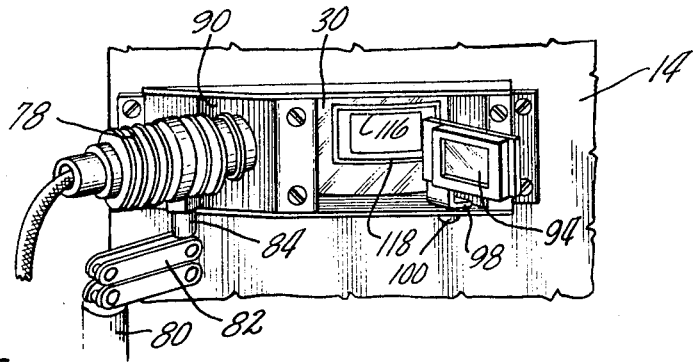
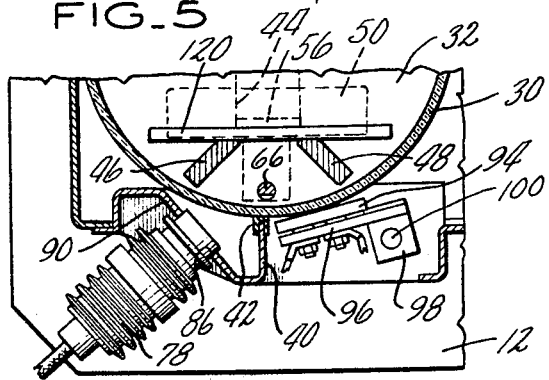
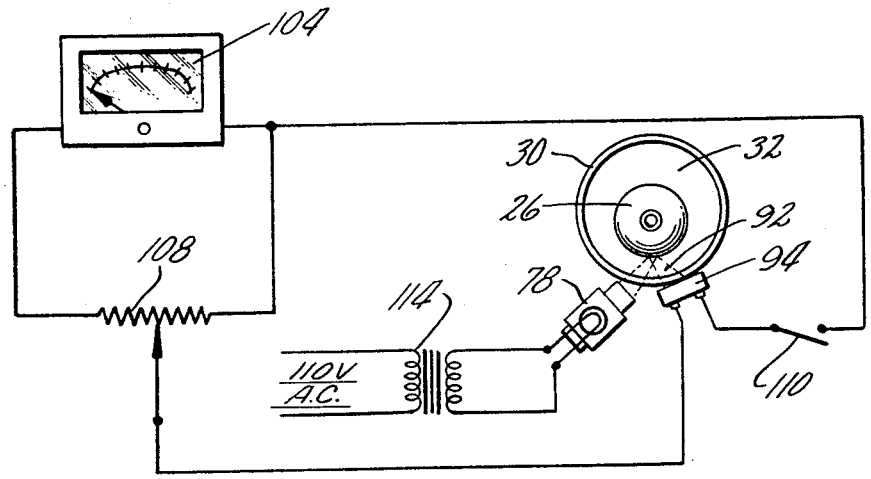
INVENTORS
AARON K. LYLE
CONSTANTINE W. KULIG
BY McCormick, Paulding & Huber
ATTORNEYS

United States Patent Office 3,397,609
Patented Aug. 20, 1968

3,397,609
OPTICAL INSPECTION APPARATUS FOR SURFACE COATINGS ON ARTICLES OF GLASSWARE OR THE LIKE WHEREIN THE ARTICLES ARE INSPECTED IN A LIQUID HAVING THE SAME INDEX OF REFRACTION AS THE GLASS
Aaron K. Lyle, West Hartford, and Constantine W. Kulig, Windsor, Conn., assignors to Emhart Corporation, Bloomfield, Conn., a corporation of Connecticut
Filed Feb. 25, 1965, Ser. No. 435,224
9 Claims. (Cl. 88—14)

This invention relates to optical inspection apparatus of the general type described in U.S. Patent No. 2,584,583 entitled, "Means for Optically Determining Relative Thickness of Surface Coatings on Glass Articles and the Like," issued to A. M. Hillery, Jr. The optical inspection apparatus in the Hillery patent is adapted to measure the relative thickness of surface coatings on articles of glassware or the like and has been found generally satisfactory in laboratory use. The Hillery apparatus is, however, found to be somewhat unsatisfactory for routine commercial use. Preparation of samples is required as in the severing of small parts or portions of articles of glassware and rather extensive adjustment of the sample holders may be required in the Hillery apparatus.

A general object of the present invention is the provision of optical inspection apparatus for surface coatings wherein various sample articles of glassware can be accommodated in their entirety without the preparation of small sample parts or portions thereof wherein little or no adjustment of the apparatus is required in the accommodation of sample articles of glassware of various sizes and shapes, and wherein the apparatus, in consequence, is well suited to routine commercial use outside the laboratory as for example in a location adjacent a glassware annealing lehr.

Another object of the invention resides in the provision of apparatus of the type mentioned and which is adapted to scan a substantial portion of the surfaces of articles of glassware which may vary greatly in size and shape, inspection not being limited to a selected cut-out part or portion of each article of glassware.

Still another object of the invention resides in the provision of apparatus of the type mentioned which exhibits a high degree of versatility in accommodating various articles of glassware as aforesaid, and which is also capable of accommodating sections of flat glass which may have been treated or subjected to film forming reactions so as to include coatings on their surfaces.

Still another object resides in the provision of apparatus of the type mentioned which is combined in a unitary assembly adapted for a high degree of ease and convenience in transportation from one location to another.

The drawings show a preferred embodiment of the invention and such embodiment will be described, but it will be understood that various changes may be made from the construction disclosed, and that the drawings and description are not to be constructed as defining or limiting the scope of the invention, the claims forming a part of this specification being relied upon for that purpose.

Of the drawings:

FIG. 4 is a fragmentary front view of the apparatus showing a photocell support or carrier swung to an open position.

FIG. 5 is a fragmentary horizontal section similar to FIG. 2 but showing a section of flat glass held in position at an inspection station in the apparatus.

FIG. 6 is a schematic wiring diagram for the inspection apparatus.

The inspection apparatus of the invention is particularly well suited to the inspection of articles of glassware and small sections of flat glass, but it is to be understood that the invention is not so limited. It is essential only that the film or surface coating to be measured have a refractive index different from that of the base material, glass in the cases under consideration. If, for example, surface coatings on plastics, crystals, or transparent crystal complexes are to be measured, the apparatus can be readily adapted to such a task dependant only upon a significant difference in the refractory indexes of the surface coating and the base material.

In particular with respect to the measurement of relative thickness and uniformity of surface coatings on articles of glassware, reference may be had to the Aaron K. Lyle U.S. Patent No. 2,375,482 on "Apparatus for Coating Glass Articles," issued May 8, 1945. As described in this patent, thin coatings may be applied to glass articles by treating them with fumes of a substance such as stannic chloride or titanium chloride. This surface treatment produces a coating, believed to be metallic oxide, which has certain highly desirable protective and other properties. The coating process is known in the art as "invisible iridizing" and the surface coating resulting from the process may be extremely thin, probably less than ¼ wave length of visible light. Surface coatings quite obviously result in economic waste if they are too thick and undesirable high iridescence of the articles of glassware may also be encountered. If the surface coatings are too thin their effectiveness is of course impaired.

In the Hillery patent mentioned above, the light reflectivity of thin films of the type mentioned is employed as a measure of relative thickness. The glassware is immersed in a liquid having a refractive index substantially identical with that of the glass but which differs substantially from the refractive index of the surface coating. A beam of light is cast upon the sample article of glassware under inspection and the intensity of a reflected beam of light is measured by a photocell and a meter device in a conventional manner. The apparatus of the present invention follows the general teaching of Hillery as to the method of securing a visual indication through optical measurement and meter read-out of film or surface coating thickness.

Figure 1:
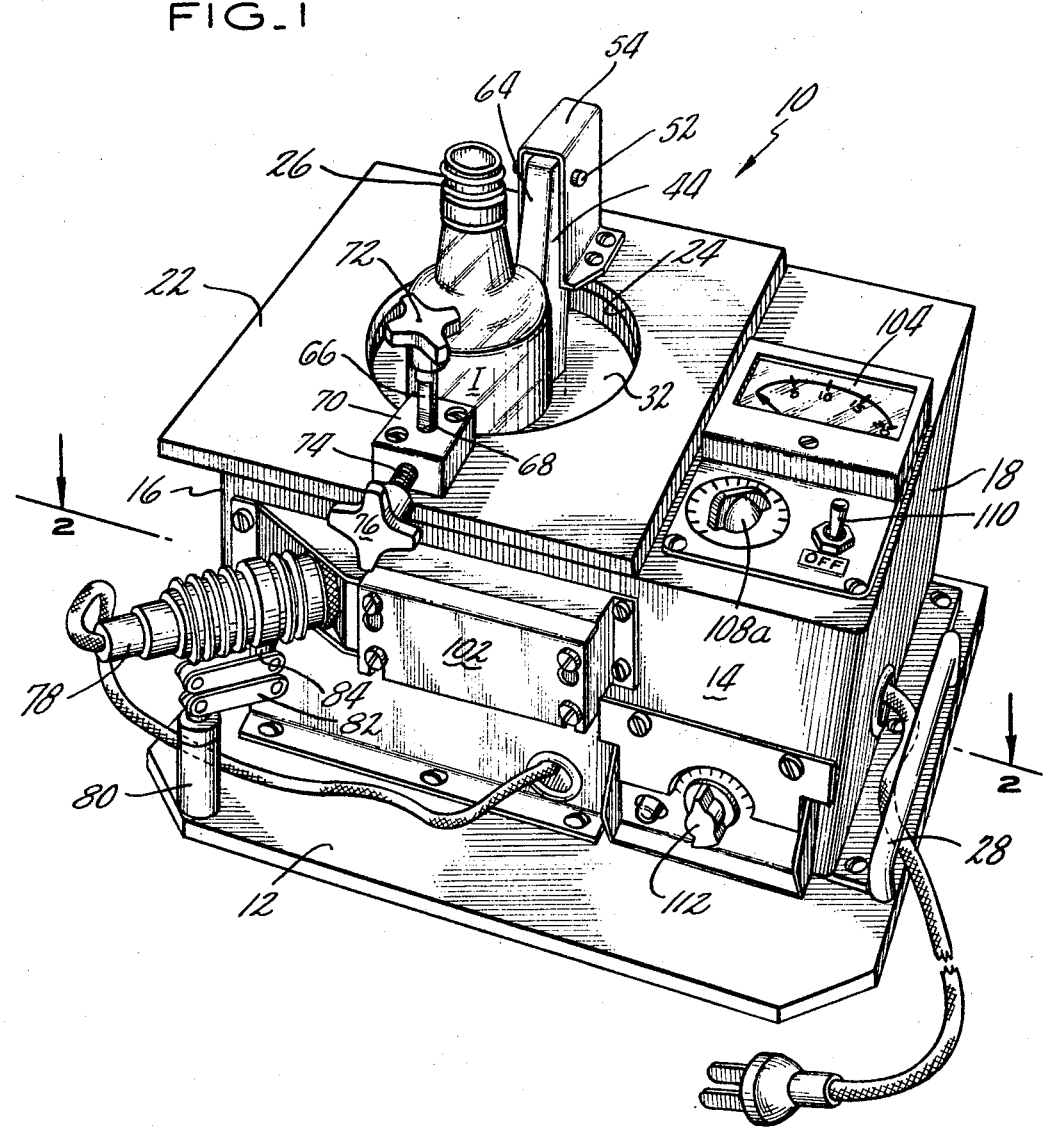
FIG. 1 is a perspective view of the inspection apparatus of the present invention showing an article of glassware in position for inspection in the apparatus.

Referring now particularly to FIG. 1, an optical inspection apparatus constructed in accordance with the present invention is shown at 10 as comprising a flat plate-like base member 12 which supports an upstanding housing having a front wall 14, opposite side walls 16, 18 and a rear wall 20. The housing is generally rectangular in planform and includes a removable cover member or plate 22 provided with a central opening 24 for the free vertical passage of articles of glassware such as a glass bottle 26. The bottle 26 is shown in upright position at an inspection station I and secured by and in engagement with a holding means to be described hereinbelow.

As will be seen, the entire assembly of the apparatus is compact and well adapted to ease and convenience in transportation from one location to another. Handles are preferably provided as at 28, 28, FIG. 2.

Figure 2:
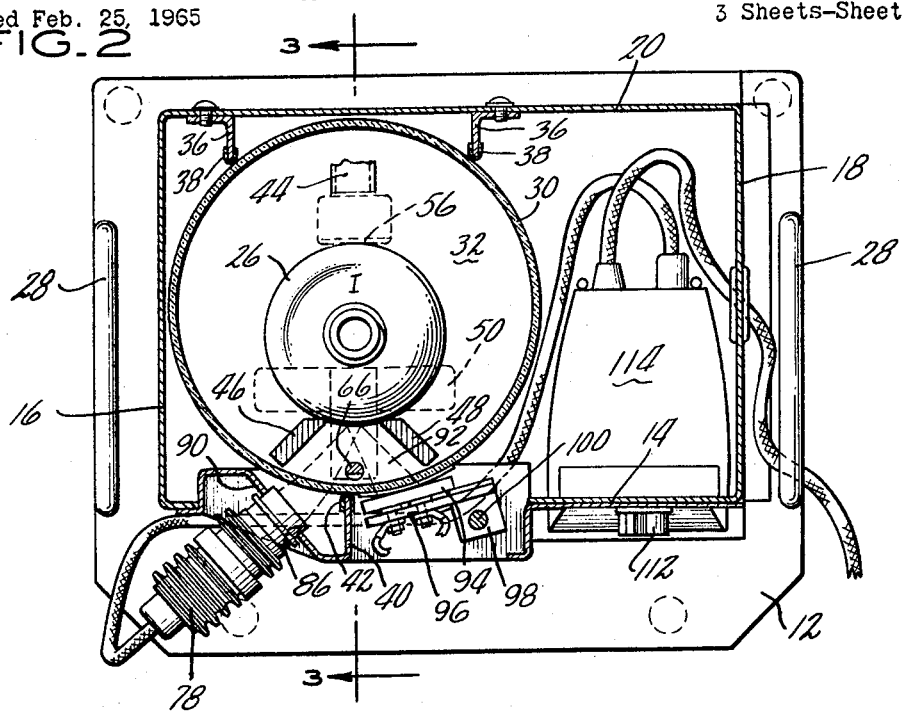
FIG. 2 is a horizontal section taken generally as indicated at 2—2 in FIG. 1.
Figure 3:
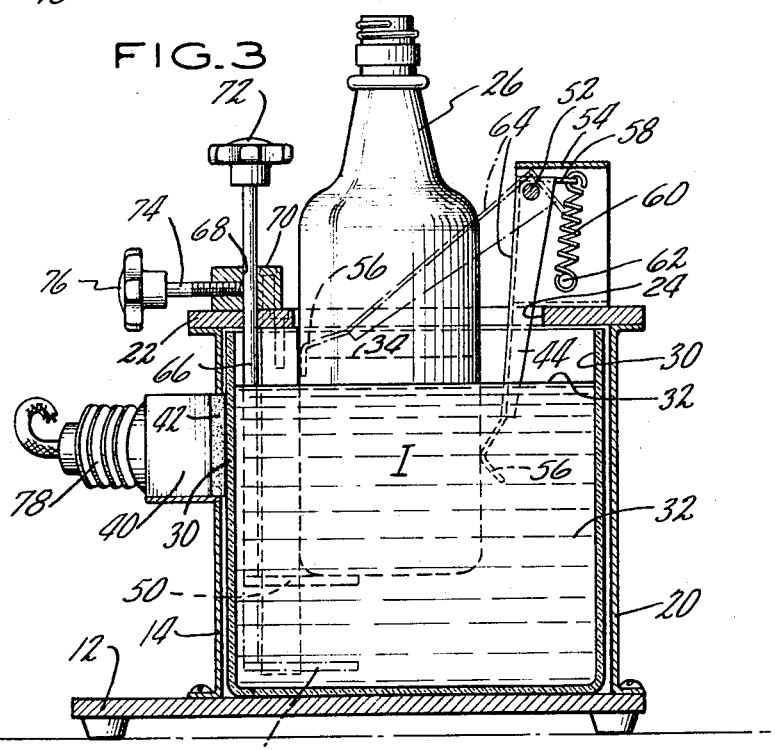
FIG. 3 is a vertical section taken generally as indicated at 3—3 in FIG. 2.

As best illustrated in FIGS. 2 and 3, a reservoir 30 is provided and is open at the top and adapted to hold a liquid having an index of refraction approximately the same as the base material of the coated article to be inspected, but which differs substantially from the index of the refraction of the surface coating on the article. Such a liquid is shown at 32 and, in the case of the surface coated glass bottle 26, the liquid 32 has an index of refraction approximately equal to the index of the refraction of glass. Xylene and monochlorobenzene have been found well suited to this use.

The reservoir 30 is open at the top as mentioned so that articles of glassware such as the bottle 26 can be readily lowered into the liquid 32 in the reservoir. With small articles of glassware, an article at the inspection station I within the reservoir may be completely immersed in the liquid 32. With larger articles such as the bottle 26, the liquid 32 may be introduced into the article so that it is approximately filled or in any event filled to a level above the annular band thereon which is to be inspected. As best shown in FIG. 3, the bottle 26 is filled to a level 34 with the reservoir liquid 32.

In accordance with the invention, the reservoir 30 is provided with at least a portion of a side wall which is transparent and in the embodiment shown, the reservoir 30 takes the form of a glass jar. With the cover plate 22 removed, the glass jar may be conveniently raised upwardly from the housing for cleaning and changing of the liquid 32. In position within the housing, two spaced apart vertically extending L-shaped members 36, 36 carry sections or strips of rubber or tape 38, 38 which engage the jar 30 at a rear portion. A vertically extending member 40 at a front portion of the housing carries a rubber or tape strip 42 which engages a front portion of the reservoir.

Further in accordance with the present invention, a holding means is provided for securing an article of glassware in an upright attitude at the inspection station I within the reservoir 30. Said holding means comprises at least one resilient holding element and at least one other holding element each of which elements is engageable with a side wall of an article at the inspection station whereby to secure the article in position and yet accommodate rotation of the article about a vertical axis. In the presently preferred embodiment shown, a resilient or spring biased holding element is provided at 44 and a pair of fixed holding elements are provided at 46, 48 on the opposite side of the article of glassware 26. There is also provided a base element which is engageable with a bottom wall of an article of glassware such as the bottle 26. Such a base element is shown at 50 in FIG. 3 in engagement with bottle 26.

Each of the elements 46, 48 is elongated vertically so as to extend substantially from top to bottom of the reservoir 30 as best illustrated in FIG. 3. Preferably and as shown, the side wall engageable elements 46, 48 are spaced apart at a front portion of the reservoir 30 and they are connected with and depend from the aforementioned cover plate or member 22. Thus, upward removal of the cover plate or member 22 results in similar removal of the elements 46, 48.

The side wall engageable element 44 is shown disposed at a rear portion of the reservoir 30 and is pivotally supported at an upper end portion by means of an appropriate pivot pin 52 supported by an upstanding bracket 54 carried on the cover plate or member 22. The element 44 depends from the pin 52 through the opening 24 in the cover plate and has a lower end portion 56 which extends angularly inwardly to engage an article of glassware such as the bottle 26. A rearwardly extending lug or ear 58 has a spring 60 connected thereto and extending downwardly therefrom to a pin 62. The pin 62 is fixed in the bracket 54 so as to retain the spring 60 under slight tension whereby to pivot the element 44 in a clockwise direction about the pivot pin 52 and to urge the portion 56 thereof into engagement with the article of glassware at the inspection station I.

The resilient or spring biased element 44 also includes a camming surface 64 at an inner portion thereof and which is adapted for engagement with a lower portion of an article of glassware such as the bottle 26 on downward movement of the bottle toward the inspection station I. The camming surface 64 is inclined inwardly and downwardly so as to be engaged by the lower portion of such an article of glassware whereby to urge the element 44 outwardly and to permit the article of glassware to descend to the inspection station I. Thus, an article of glassware such as the bottle 26 is merely urged downwardly against the camming surface 64 and the holding means automatically receives and secures the bottle in position at the inspection station I where it can be conveniently manually rotated for inspection.

The base element 50 is preferably adjustable vertically so as to accommodate articles of glassware of various heights, the aforesaid element 44 having a relatively large range of swinging movement so as to readily accommodate articles of glassware of various diameters. An elongated vertical rod 66 carries the base element 50 at a lower end portion thereof and is slidably entered in a suitable opening 68 in a block 70 carried on the cover plate 22. A small knob 72 is provided for convenience in manipulation of the rod 66 and a binder screw 74 is provided with a similar knob 76. Thus, the binder screw 74 may be partially withdrawn to permit ready adjustment of the vertical position of the base element 50. When the element has been moved to a selected position, the binder screw may be tightened to engage the rod 66 and to secure the same and the base element in position.

A light source unit 78 is provided at a front portion of the apparatus and is held in position by a supporting means comprising a post 80 and a scissors linkage 82 which supports a small post 84. The scissors linkage 82 provides for adjustment of the light source 78 about a horizontal axis and for flat vertical upward and downward movement of the light source unit. Adjustment of the light source unit about a vertical axis is provided for by the posts 80 and 84. As best shown in FIG. 2, the light source unit 78 emits a generally horizontal beam of light which enters the housing through a suitable opening 86 in a bracket 90 and which is bent slightly in passing through the front portion of the reservoir wall 30 before eventually impinging upon a front portion of an article of glassware such as the bottle 26 at the inspection station I. A reflected beam of light 92 from the surface coating on the article of glassware 26 is cast angularly with respect to the beam from the light source 78 and outwardly through the front portion of the wall of the reservoir 30. As mentioned, the intensity of the reflected beam 92 will vary with the thickness of the surface coating on the bottle 26 and the beam will also provide a measure of uniformity of coating in an annular band about the bottle as the bottle is rotated about its axis in the aforedescribed holding means.

The apparatus also includes a light sensitive receiving unit in the form of a selenium photocell 94 held on a swingable support 96 in position to receive a reflected light beam 92 from the surface coating on an article of glassware under inspection. The support 96 has a small wing or ear 98 mounted swingably upon a pin 100 so as to swing the photocell to the operative position shown in FIG. 2 and forwardly or outwardly to the inoperative position of FIG. 4. A cover plate 102 is preferably provided as illustrated in FIG. 1 when the photocell is in its operative position.

There is also provided an electrical means including a meter 104 connected with the photocell 94 and adapted to provide a visual indication which varies with the strength of the beam of light reflected from the surface coating on an article under inspection. The electrical means is quite conventional and includes a micro-ammeter 104 shown in FIG. 1 and in the schematic wiring diagram of FIG. 6. Appropriate conductors connect the ammeter with the photocell 94 and a variable resistor 108 is preferably provided together with an on-off switch 110.

The switch 110 is shown on the control panel in FIG. 1 together with a control knob 108a for the variable resistor 108. A control knob 112 shown in FIG. 1 is associated with a variable transformer 114 in the wiring diagram of FIG. 6 in a supply circuit for the light source unit 78. Thus, the intensity of the beam of light cast by the light source unit 78 may be conveniently adjusted by rotation of the knob 112. The on-off switch of course provides for convenient on-off conditioning of the apparatus and the control knob 108a may be manipulated to vary the sensitivity of micro-ammeter 104.

In a set-up operation of the inspection apparatus of the present invention, a sample article of glassware of the smallest diameter expected to be encountered is placed at the inspection station I and the photocell 94 and its support 96 are swung to the open position of FIG. 4. As will be seen in FIG. 4, indicia is provided on the reservoir 30 and in preferred form the said indicia takes the form of inner and outer rectangles 116 and 118. The outer and larger rectangle 118 is employed in aligning the indicia properly in registry with the reflected light beam and photocell 94. That is, the reservoir 30 is rotated with the photocell in closed position to register the rectangle 118 with the reflected beam 92 and with the photocell 94. The photocell and its support is then swung outwardly as shown in FIG. 4 and both rectangles, but primarily the smaller or inner rectangle 116, may be used in properly adjusting the intensity and position of the beam of light from the light source unit 78. The reflected beam from the smallest diameter article of glassware or bottle will be "fanned out" with respect to the configuration of reflected beams from larger diameter bottles and flat glass and will have the largest horizontal dimension of reflected beams from any articles to be inspected by the apparatus. Thus, when the light source unit has been properly adjusted so as to center the "fanned out" beam both horizontally and vertically with respect to the rectangles 116, 118, the said beam will register accurately, on the photocell 94 when the latter is moved to its closed and operative position. Similarly, reflected beams from all other articles of glassware or from flat glass will register properly on the photocell. Articles of glassware of larger diameter will have reflected beams somewhat smaller in horizontal dimension than the beam from the article of smallest diameter and the reflected beam from flat glass will be still narrower. In operation of the apparatus the jar 30 is preferably rotated after the set-up operation so that the rectangles 116 and 118 are moved out of registry with the reflected light beam 92.

Articles of glassware are placed successively at the inspection station I after set-up operation and each article of glassware is rotated so as to provide a reading as to the relative thickness of the surface coating and the uniformity thereof through the length of an annular band on the article. No new set-up operation is required when articles of different size are to be accommodated and a desirably simple and effective inspection operation is provided for.

The aforementioned member 40 bearing the small rubber or tape strip 42 will now be seen to provide a shielding function. That is, stray light from the light source 78 is prevented by the said member and the strip or tape 42 from passing directly to the photocell 94 and resulting in inaccurate and incorrect meter readings.

In FIG. 5, a section of flat glass 120 is shown in position against the holding elements 46, 48 and in engagement with the base element 50 and the resilient holding element 44. As illustrated in FIGS. 3 and 5, the element 44 is adapted to swing at least approximately to a plane common to the inner surfaces of the elements 46, 48 so as to effectively secure flat glass sections such as the section 120 is position for inspection. It is merely necessary to move the flat glass section downwardly to the inspection station I whereby to urge the element 44 rearwardly to a slight extent and to secure the glass section in position under nominal spring pressure.

As will be seen from the foregoing, the optical inspection apparatus of the present invention exhibits a high degree of ease and convenience in set-up, a high degree of versatility in operation, and is well suited to routine commercial use adjacent glass annealing lehrs or other commercial installations.

The invention claimed is:

1. In optical inspection apparatus for measuring the relative thickness of light reflective surface coatings on articles of glassware or the like, the combination comprising a reservoir open at the top and containing a liquid having an index of refraction approximately the same as the base material of the coated article but which differs substantially from the index of refraction of the surface coating on the article, said reservoir having at least a portion of a side wall which is transparent, means for holding an article of glassware in an upright attitude at an inspection station within said reservoir with the article of glassware at least approximately filled with the reservoir liquid, said holding means including at least one resilient holding element and at least one other holding element each engageable with a side wall of an article at the inspection station and adapted to secure the article in position and yet accommodate rotation of the article about a vertical axis, and said holding means including at least one camming surface engageable by an article on downward movement of the article from above the inspection station and serving to accommodate downward insertion of the article into said holding means and automatic retention of the article at said inspection station by said holding means, a light source unit and means supporting the same in position outwardly of said reservoir so as to cast a beam of light generally horizontally through said transparent wall portion and at an acute angle to the surface coating of said article of glassware or the like secured at said inspection station by said holding means, a light sensitive receiving unit and means supporting the same outwardly of said reservoir so as to accept a generally horizontal beam of specularly reflected light through said transparent wall portion of said reservoir and from the surface coating on an article held at said inspection station, and electrical means including a meter connected with said light sensitive receiving unit and adapted to provide a visual indication which varies with the strength of the beam of light reflected from the coating on an article under inspection.

2. The combination in optical inspection apparatus as set forth in claim 1 wherein said transparent wall portion of said reservoir is provided with indicia adapted to be disposed in registry with said reflected light beam between an article under inspection and the light sensitive receiving unit, said indicia serving to facilitate set-up operations wherein adjustment of the position of said light source unit may be required to properly register said reflected light beam with said receiving unit.

3. The combination in optical inspection apparatus as set forth in claim 1 wherein a removable cover member is provided above said reservoir and has a central opening for the free vertical passage of articles of glassware or the like to and from said inspection station and holding means, said holding means being mounted on and depending from said cover member and removable from the reservoir with the cover member, free access to the reservoir and convenient removal thereof thus being provided for.

4. The combination in optical inspection apparatus as set forth in claim 1 wherein said holding means comprises at least three side wall engageable elements, one of which constitutes said resilient element, and wherein there is provided a base element engageable with the bottom wall of an article of glassware or the like at said inspection station, said three side wall engageable elements being arranged in spaced relationship with respect to each other such that articles of glassware of different diameters can be readily accommodated thereby.

5. The combination in optical inspection apparatus as set forth in claim 4 and including means connected with said base element and serving to adjust the same vertically whereby to accommodate articles of glassware of different heights at said inspection station, at least one of said side wall engageable elements being elongated vertically so as to engage the side walls of articles of glassware of various sizes and shapes irrespective of adjustment of said base element.

6. The combination in optical inspection apparatus as set forth in claim 5 wherein said resilient element is spring biased inwardly toward said other two side wall engageable elements, said element also having the aforesaid camming surface located at an inner portion thereof and said surface being inclined downwardly and inwardly, downward movement and engagement of an article of glassware or the like with said camming surface serving to urge said element outwardly and accommodate entrance of the article to the inspection station between said three side wall engageable elements and atop said base element.

7. The combination in optical inspection apparatus as set forth in claim 6 wherein said three side wall engageable elements are disposed in a triangular arrangement with the aforesaid resilient element generally opposite the other two elements and with the beam of light striking an article under inspection between said other two elements.

8. The combination in optical inspection apparatus as set forth in claim 7 wherein said resilient element is pivotally supported adjacent an upper end portion and swingable inwardly and outwardly therebeneath respectively under spring and camming action as aforesaid, the length of the element and the construction and arrangement of connected spring biasing means being such that the lower end portion of the element is swingable at least approximately to a vertical plane common to the inner surfaces of said other two elements, flat articles of glassware thus being accommodated at said inspection station by engagement between said three elements.

9. The combination in optical inspection apparatus as set forth in claim 8 and including shielding means disposed outwardly of said reservoir and between said light source unit and said light sensitive receiving unit whereby to prevent stray light from passing from the former to the latter independently of the reflected beam from the surface coating on an article under inspection.

References Cited

UNITED STATES PATENTS 2,584,583 2/1952 Hillery.
3,302,786 2/1967 Conrad.

JEWELL H. PEDERSEN, *Primary Examiner.*

O. B. CHEW, *Assistant Examiner.*